Figure 1:
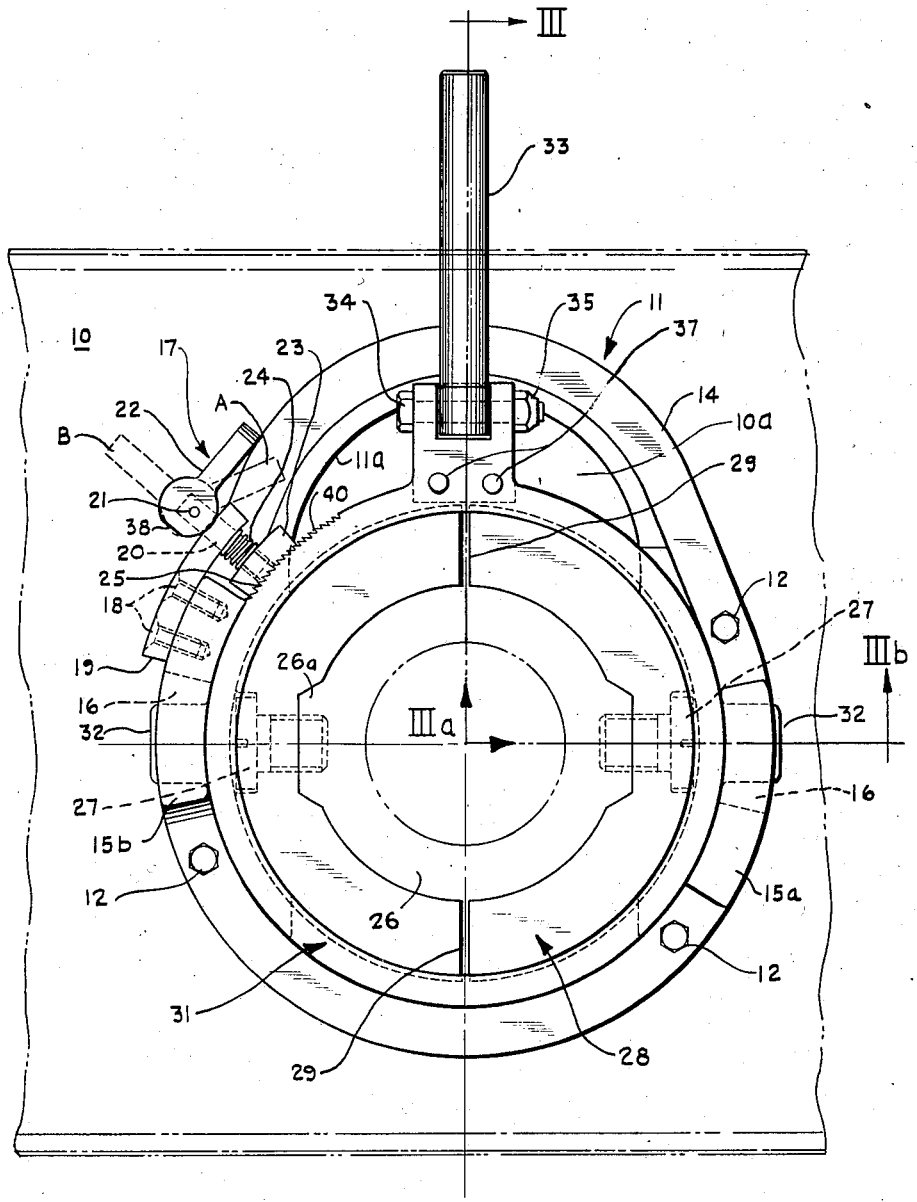

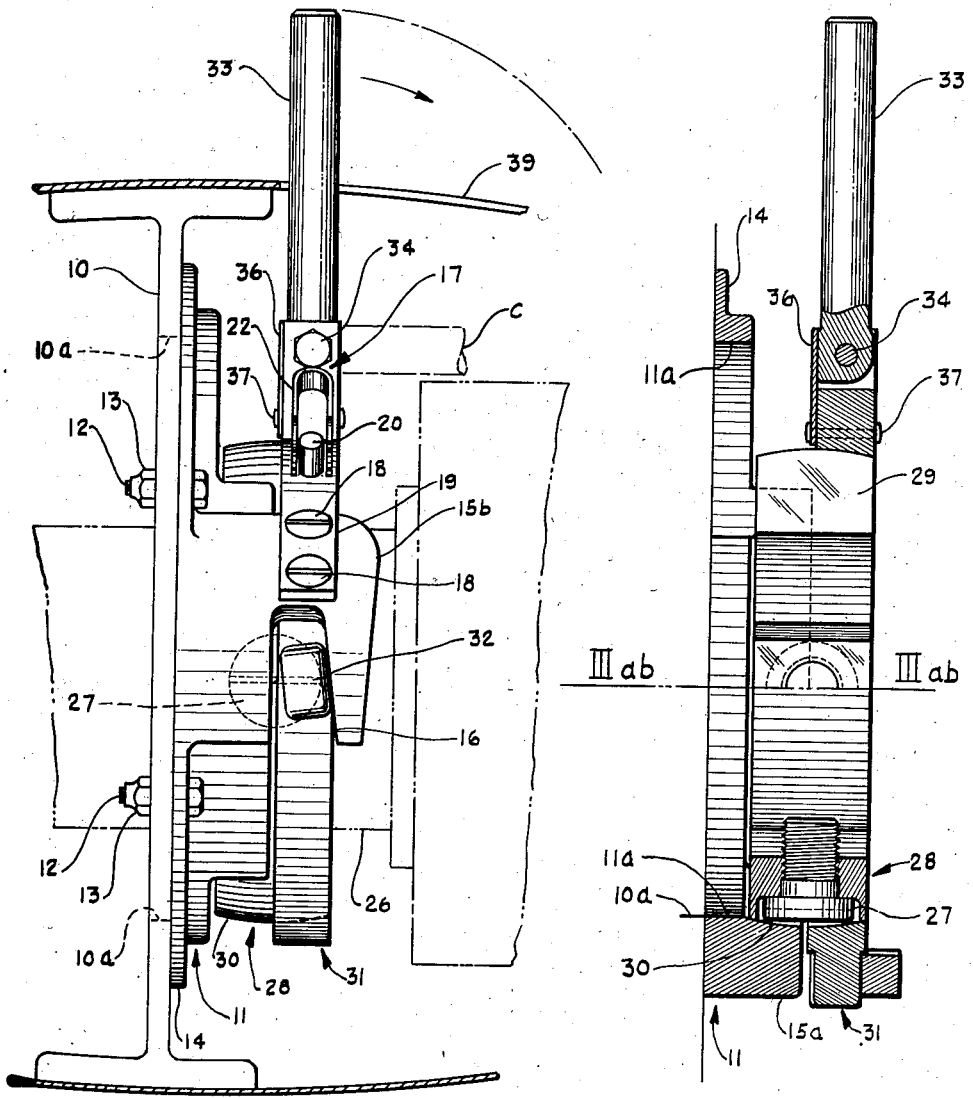

Patented June 12, 1945

2,378,260

UNITED STATES PATENT OFFICE 2,378,260

QUICK DETACHABLE GUN MOUNT

Clem G. Trimbach, Eggertsville, and Paul M. Birk, Kenmore, N. Y., assignors to Curtiss-Wright Corporation, a corporation of Delaware Application October 17, 1942, Serial No. 462,358

10 Claims. (Cl. 89—37.5)

This invention relates to armament and more particularly provides improvements in mountings for machine guns in aircraft or other vehicles.

It has been the general practice to mount fixed guns in the wings or other parts of the airplane, by providing a trunnion attaching the forward portion of the gun to a structural member of the airplane, and to provide screw adjustments attaching the rearward end of the gun to another structural part of the airplane. By altering the adjustments, the line of fire of the gun may be changed so that at some fixed range it will converge with the longitudinal axis of the airplane.

Such guns have usually been attached to their supports by means of through bolts which, when it was necessary to dismount the gun for service, were difficult to remove, since the gun and its supports are generally in rather cramped quarters. These difficulties made it likely that the sighting adjustments would be disturbed, so that the gun would have to be realigned to obtain the correct line of fire.

The present invention comprises essentially a quick detachable mount for a fixed gun consisting of a universal ball and socket type joint provided with a tapered bayonet slot and lug attachment and a positive quick acting detent. The mount is devoid of the necessity of using threaded parts in its detachment and overcomes the disadvantages of prior mounts of this type.

Accordingly, the principal object of this invention is to provide an arrangement whereby a gun may be quickly and easily emplaced and removed from its mount without the use of special tools and without disturbing the lateral and vertical adjustments of the parts; and which can be just as readily replaced in its mount and positively locked firmly in place so that vibration cannot possibly shake it loose.

Another object is to provide a gun mount which, along with the gun, may be located completely within the confines of the wing or other structure and mounted directly on the spar, so that there are no projections to interfere with the speed characteristics of the airplane.

Further objects include the use of a simple, rugged construction, light in weight and requiring few parts, none of which have close tolerances, and all of which can be cheaply made.

Other objects and advantages of the invention will be apparent during the course of the following description.

In the accompanying drawings, forming a part of this specification:

Fig. 1 is a rear view of the gun mount installed in the wing spar;

Fig. 2 is a side view of the gun mount of Fig. 1 looking at the assembly from the left of Fig. 1; and Fig. 3 is a cross-sectional view taken along the line III—IIIa and the line IIIa—IIIb of Fig. 1. The upper half of the section is taken along the vertical axis from III to IIIa, looking from the left. The lower half of the section is taken along the horizontal axis from IIIa to IIIb looking from below, this latter section being, in effect, rotated clockwise through 90 degrees.

An opening 10a is cut in the forward spar 10 of the wing to which it is desired to fasten the gun mount. This opening must be elongated and of size sufficient to provide plenty of clearance for the barrel of the gun, both in assembly and after it is in place. On the rear side of the web of the spar 10 and aligned with the opening 10a, the main bracket 11, having a similarly elongated opening 11a, is fastened by means of four, or any other suitable number, mounting bolts 12 and locked in place by their nuts 13. These bolts 12 are located on the main bracket flange 14 as close to the two opposed arcuate ears or bosses 15a and 15b of the bracket 11 as is practicable. The left boss 15b as seen in Fig. 1, extends a short distance below the horizontal axis and several times that distance above the horizontal. The right boss 15a is inverted, the shorter or open end extending above the horizontal axis and the longer or closed end extending below the axis. In each of these bosses 15a and 15b, located 180 degrees apart and arranged symmetrically about the horizontal axis, a slot 16 is provided. On the opposite side from where the slot 16 is located in the boss 15b there is provided a lock or latching assembly 17. Two flat head screws 18, extending through one end of the lock bracket 19 fasten the lock 17 to the side of the boss 15b. The other end of the bracket 19 is provided with a hole through which a pin 20 can slide freely. One end of this pin 20 is pivoted at 21 to the U-shaped lever or handle 22. The pivot 21 is located in the circular open-ended portion of the lever 22, but slightly off-center, so that the lever 22 works eccentrically on the bracket 19. The other end of the pin 20 is screwed or otherwise securely fastened into a dog 23. A coil spring 24 is seated between the bracket 19 and the dog 23, coaxially with the pin 20. Teeth 25 are cut across the arcuate surface of the dog 23, on the side away from the spring 24.

In the full line position of the latch 22 as shown in Fig. 1 it has been rotated to an intermediate position at which the surface of its cam face is nearer the pivot 21 than the flattened cam portion 38. This has the effect of permitting release of the compression spring 24 (which normally tends to separate the opposed surfaces of the bracket 19 and the dog 23), causing the pin 20 and the attached dog 23 to move inwardly in a radial direction in which the teeth 25 of the dog 23 engages the teeth 40 of the retaining ring 31. Further movement of the latch 22 into the dotted position A merely places the lever in its limit position at which the dog 23 is still firmly engaged with the ring 31. In order to release the dog 23 from the ring the latch is rotated in a counterclockwise direction as viewed in Fig. 1 into its dotted position at B in which the axis of the pivot 21 is moved outwardly from the axial centerline of the mount due to the increased radius of the eccentric portion, thereby overcoming the compression in the spring 24 and withdrawing the dog 23 and its teeth from engagement with those of the ring, the lever 22 remaining in this position as long as the flattened portion 38 is permitted to rest upon the outer surface of the bracket 19.

Rigidly fastened to the gun barrel element 26, by means of two opposed fastening screws 27, is the adapter ball ring 28. This ring 28 is preferably initially made in one piece and split in two, as shown at 29. The outer surface of the ring 28 is of part-spherical or ball shaped, as shown at 30, the screw heads being disposed such that they do not project beyond the spherical surface of the ball element. Over the adapter ring 28 there is fitted the retaining ring 31, having a similar spherical surface. As can be seen in the lower portion of Fig. 3, the main bracket ears 15a and 15b are also cut out to the same spherical diameter to a depth sufficient to form a socket or seat for the ring 28. For the rest of the depth of the opening 11a, the diameter is cylindrical except for its upwardly extending portion. Lugs 32 protrude on opposite sides of the ring 31, and are so shaped and positioned that they fit into the corresponding slots or open ends 16 in the main bracket 11. The lugs 32 are set at a slight angle to the vertical, the embodiment shown being approximately 4 degrees. The rear side of the slot 16 is also tapered or cut at this angle, as shown in Fig. 2. such that when the retaining ring 31 is rotated clockwise through a sufficient angle, a wedging action takes place, preventing the gun assembly from moving in an axial direction. This occurs because the retaining ring 31 forces the spherical surface 30 of the adapter ring 28 into the corresponding spherical socket formed in the bracket 11, as can be clearly seen in the lower half of Fig. 3. The upper portion of the ring 31 is suitably built up to allow a handle 33 to be pivoted on a bolt 34, locked in place with the nut 35. On the front side of the ring 31, a thin flat spring 36 is provided, held in place by means of rivets 37. The purpose of this spring 36 is to hold the handle 33 in place when the latter is snapped into the vertical position, for mounting the gun, and then to keep the handle 33 from vibrating when the gun is in use, after the handle 33 has been rotated through 90 degrees to its retracted position C.

To mount the gun the procedure is as follows: First, it should be ascertained that the dog 23 will clear the ring 31 by rotating the lever 22 in a counterclockwise direction to the dotted line position B in Fig. 1, until the flat portion 38 rests upon the bracket 19. The retainer ring 31 is then fitted over the adapter ring 28, with the handle 33 grasped by the operator in one hand and held in a vertical position. With his other hand, the operator grasps a convenient part of the rear of the gun and shoves the barrel portion 26 forward through the openings 11a and 10a in the bracket 11 and the wing spar 10, respectively. When the gun has been pushed in through these openings sufficiently, the lugs 32 will come adjacent to the bracket 11. The handle 33 is then rotated about the axis of the gun barrel in a clockwise direction until the lugs 32 become slightly wedged into the slots 16. The gun is now fixed with respect to its main support at the spar 10 to the extent that the center of the gun adapter ball substantially coincides with the center of the supporting socket, but the gun is still free to be universally rocked or trained about this center, both in traverse and elevation, and at intermediate angles. This allows for adjustments to be made to correct the aiming of the gun, by means of the usual adjustment screws or other known adjustment devices in the rear mounting of the gun, which is not shown, not being a part of the present invention.

After the gun has been correctly aimed by rotation about the center of its forward mount and the setting of the adjustment screws at the rearward mount is fixedly made, the operator then further rotates the handle 33 and the attached socket ring 31 until the maximum wedging action between the lugs 32 and the slot 16 is obtained. Next, he turns the lever 22 of the locking device 17 in a clockwise direction into the dotted line position A until the teeth 25 of the dog 23 are forced into the complementary teeth 40 of the ring 31. This prevents relative rotation between the ring 31 and the socket element 11, and the gun is now rigidly fixed in position. After the gun has been mounted and adjusted, and the handle 33 snapped back and retracted into the horizontal position shown at C, a cover plate, not shown, is placed over the opening 39 provided in the wing to give access to the gun. This cover should preferably be flush with the outer surface of the remainder of the wing and is held in place with suitable fasteners.

Although the embodiment shown is particularly applied to an airplane wing, it is apparent that the present invention, and the mechanisms and principles involved therein, can be used for mounting machine guns in other parts of an airplane, or in other forms of vehicles.

While we have described our invention in detail in its present preferred embodiment, it will be obvious to those skilled in the art, after understanding the invention, that various changes and modifications may be made thereon without departing from the spirit or scope thereof. We aim in the appended claims to cover all such modifications and changes.

We claim:

1. A quickly detachable gun mount comprising a gun, a gun supporting structure, a ball element fixed to said gun, a part-spherical socket element fixed to said structure provided with a plurality of circumferentially tapered slots, and a part-spherical retainer ring provided with a plurality of radially extending lugs wedgingly engageable with said slots upon rotation of said ring for the fixation of said gun to said supporting structure.

2. In an ordnance installation including a gun and a supporting structure, a quickly detachable mount comprising a ball element fixed to said gun, a part-spherical socket element having a plurality of circumferentially tapered slots, said socket element fixedly attached to said structure, a rotatable part-spherical socket element having a plurality of radially extending lugs adapted upon rotation to wedgingly engage said slots of said fixed socket element for the clamping of both socket elements about said ball element, and latching means carried by said fixed socket element engageable with said rotatable socket element for fixing the said clamped relationship therebetween.

3. In aircraft ordnance including a gun and a supporting structure, a quickly detachable gun mount comprising a ball element fixed to said gun, a part-spherical socket element fixed to said structure, said socket element having a plurality of slots tapered in the circumferential direction with respect to its axis, a part-spherical rotatable socket element provided with a plurality of radially extending lugs adapted upon rotation to wedgingly engage said slots to draw the said socket elements together in an axial direction for the clamping of the said ball element therebetween, and radially slidable means guided within a portion of said fixed socket element engageable with the periphery of said rotatable socket element to lock the same against relative rotation.

4. An aircraft ordnance installation including a gun and a gun supporting structure, a quickly detachable gun mount comprising a ball element fixed to said gun, a socket element fixed to said structure provided with circumferentially tapered slots, and a rotatable retaining ring provided with radially extending lugs wedgingly engageable with said slots for axially drawing said socket element toward said ring to clampingly retain said ball element within said socket element.

5. In aircraft ordnance a gun and a gun supporting structure, a quickly detachable gun mount comprising a ball element fixed to said gun, a socket element fixed to said structure, circumferentially disposed slots having inclined bearing faces formed in said fixed socket element, a rotatable retaining ring provided with radially disposed lugs wedgingly engageable with the fixed bearing faces of said slots for axially retaining said ball element within said socket element and toothed means cooperatively carried by said socket element and said retaining ring for preventing relative rotation therebetween.

6. A quickly detachable gun mount installation comprising a gun, a gun supporting structure, a ball element fixed to said gun, a socket element fixed to said structure, circumferentially tapered slots in said socket element, a retainer ring provided with lugs wedgingly engageable with said slots upon rotation with respect thereto for approaching axial movement of said socket element and said retainer ring and clamping fixation of said gun-carrying ball element to said supporting structure, and spring-pressed means to lock the said socket element to the said retainer ring.

7. In a gun mount including a gun and a gun supporting structure, quickly detachable means comprising a ball element fixed to said gun, a socket element fixed to said structure, circumferentially extending slots having inclined faces formed in said socket element, a rotatable retainer ring provided with lugs engageable with the faces of said slots upon rotation with respect thereto for the wedging fixation of said gun to said supporting structure, a retractable handle pivotally attached to said retainer ring for imparting rotation thereto for the said engagement of said lugs within said slots, and spring-pressed means to lock the said socket element to the said retainer ring.

8. In a quickly detachable gun mount, including a fixed type machine gun, a supporting structure, universal means for rockably supporting a central portion of said gun to said structure, and attachment means associated with the rearward portion of said gun for fixing said gun to the structure in one of its rockably aimed positions, said universal means including a ball element fixed to said gun, a socket element fixed to said structure, said socket element provided with circumferentially disposed slots having inclined faces, and a rotatable socket element having radially extending portions adapted upon rotation about said gun axis to wedgingly engage the faces of said slots for axially clamping and fixing said first gun portion with respect to said supporting structure.

9. In a fixed gun installation including a gun, a gun supporting structure and a ball element fixed to said gun, means for readily attaching said gun-carrying ball element to said supporting structure comprising a socket element fixed to said structure provided with circumferentially tapered slots and a rotatable retaining ring provided with radially extending lugs wedgingly engageable with said slots for axially drawing said socket element toward said ring to clampingly retain said ball element with respect to said supporting structure.

10. In a fixed gun installation including a gun, a gun supporting structure and a ball element fixed to said gun, a quickly detachable gun mount comprising a part-spherical socket element fixed to said supporting structure, said socket element having a plurality of slots tapered in the circumferential direction with respect to its axis and a part-spherical rotatable socket element provided with a plurality of radially extending lugs adapted upon rotation to wedgingly engage said slots to draw the said socket elements together in an axial direction for the clamping of the said ball element therebetween.

CLEM G. TRIMBACH.
PAUL M. BIRK.